US00RE42155E

(19) United States
(12) Reissued Patent
Ragner

(10) Patent Number: US RE42,155 E
(45) Date of Reissued Patent: Feb. 22, 2011

(54) LIGHT-WEIGHT SELF-PROPELLED VACUUM CLEANER

(75) Inventor: Gary Dean Ragner, Gainsville, FL (US)

(73) Assignee: Tacony Corporation, Fenton, MO (US)

(21) Appl. No.: 12/340,282

(22) Filed: Dec. 19, 2008

Related U.S. Patent Documents

Reissue of:
(64) Patent No.: 7,150,068
Issued: Dec. 19, 2006
Appl. No.: 10/639,659
Filed: Aug. 12, 2003

U.S. Applications:
(60) Provisional application No. 60/403,130, filed on Aug. 12, 2002.

(51) Int. Cl.
*A47L 5/30* (2006.01)

(52) U.S. Cl. ..... 15/340.2; 15/384
(58) Field of Classification Search ..... 15/319, 15/340.2, 354, 355, 361, 369, 377, 41.4, 15/43, 48.2, 384
See application file for complete search history.

(56) References Cited

U.S. PATENT DOCUMENTS 755,596 A * 3/1904 Keyes ..... 15/347
2,266,075 A * 12/1941 Replogle ..... 15/335
3,220,043 A * 11/1965 Lampe ..... 15/340.2
3,460,187 A * 8/1969 Gordon ..... 15/361
4,426,751 A * 1/1984 Nordeen ..... 15/384
4,577,366 A * 3/1986 Miller et al. ..... 15/388
4,624,025 A * 11/1986 Kaulig et al. ..... 15/41.1
4,845,797 A * 7/1989 Kobayashi ..... 15/41.1
4,850,077 A * 7/1989 Venturini ..... 15/384
5,307,538 A * 5/1994 Rench et al. ..... 15/352
6,073,303 A * 6/2000 Hinojosa ..... 15/385
6,918,156 B2 * 7/2005 Joo et al. ..... 15/388
2002/0124334 A1 * 9/2002 Worwag ..... 15/52.1

* cited by examiner

*Primary Examiner*—Shay L Karls
(74) *Attorney, Agent, or Firm*—The Small Patent Law Group LLP; Dean D. Small; Christopher R. Carroll

(57) ABSTRACT

A vacuum cleaner power head (40) for vacuum cleaning and having two counter rotating agitators 52 and 54. Motor (60) rotates agitators (52) and (54) through transmission (70), and also rotates suction fan (65) to provide suction air to the rotary brush agitators. Exterior housing 48 and inner housing (49) provide air suction passageways to direct suction air through fan (65) and out of the housing to a dirt collection bag (34). Self-propelled function is provided by using user force on handle (32) to create differential contact friction between the two counter-rotating rotary brush agitators so that a net traction force is generated that propels power head (40) in the direction the user is pushing.

37 Claims, 7 Drawing Sheets

LIGHT-WEIGHT SELF-PROPELLED VACUUM CLEANER

Figure 1:
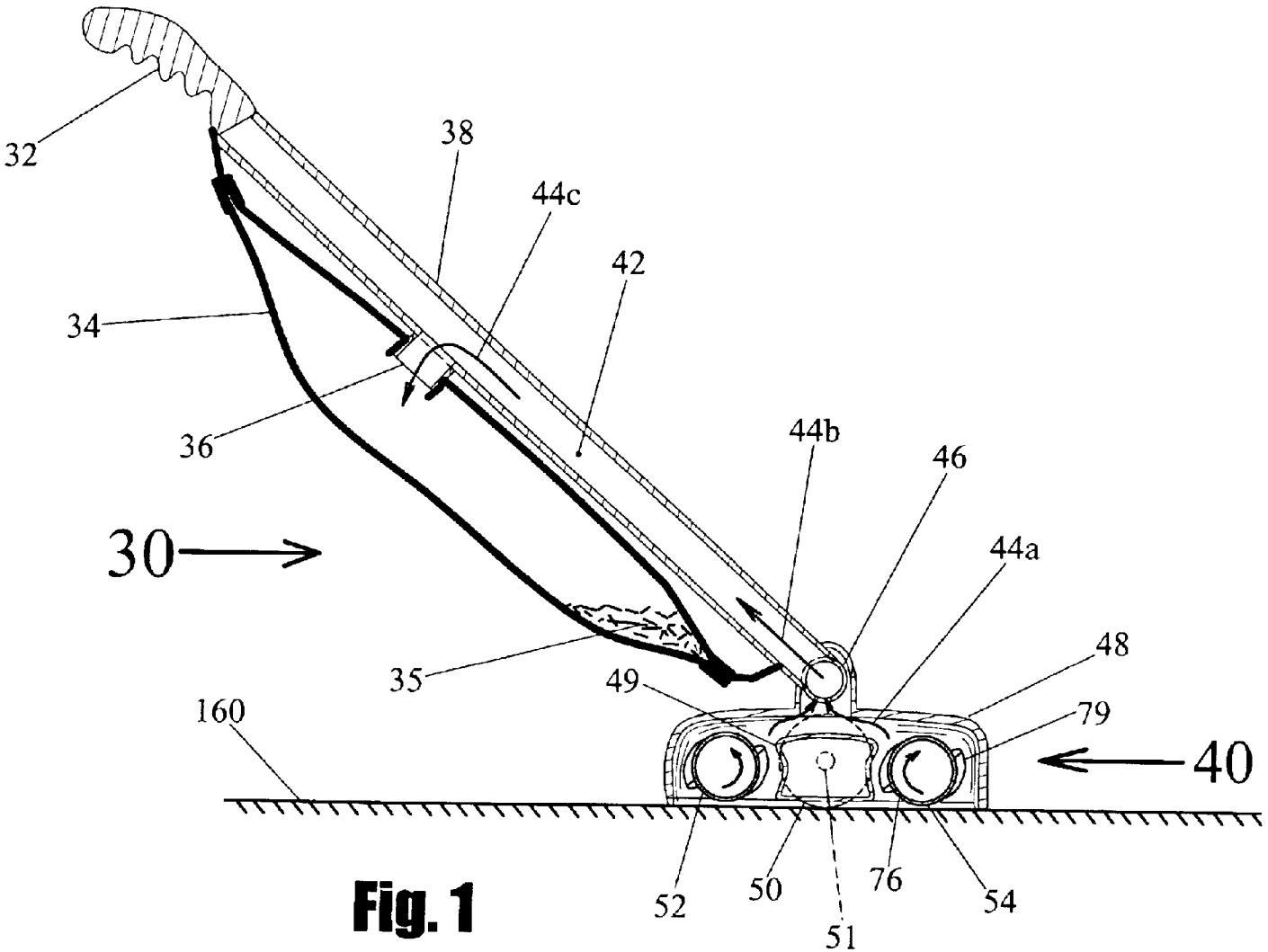

Matter enclosed in heavy brackets [ ] appears in the original patent but forms no part of this reissue specification; matter printed in italics indicates the additions made by reissue.

CROSS-REFERENCE TO RELATED DOCUMENTS

*More than one reissue application has been filed for the reissue of U.S. Pat. No. 7,150,068. The reissue applications for U.S. Pat. No. 7,150,068 are the present application (U.S. patent application Ser. No. 12/340,282) and U.S. patent application Ser. No. 12/984,964.*

This patent application claims priority from U.S. Provisional application Ser. No. 60/403,130, filed on Aug. 12, 2002, which claims priority from U.S. Disclosure Document No. 478,683 filed on Aug. 17, 2000, titled, "Counter-Rotating Beater Bar Drive for a Vacuum Cleaner".

BACKGROUND—FIELD OF INVENTION

This invention relates to vacuum cleaners and more specifically to vacuum cleaners with power assisted motion, or self-propelled motion of the vacuum power head.

SUMMARY

The vacuum cleaner design disclosed [hear] *here* teaches a way to provide a self-propelled vacuum cleaner with little or no added weight to the vacuum. Traditionally, putting a wheel drive system on a vacuum cleaner has greatly increased the weight of the vacuum. The need for a heavy transmission, clutch and large drive wheels has made power assisted or self-propelled vacuums bulky. The disclosed invention provides very precise motion control without the need for drive wheels, control switches, clutches, or a bulky transmission. Instead, the disclosed invention relies on rotary brush agitator friction (traction) to self-propel the vacuum. Most vacuums use a single rotary brush agitator, sometimes referred to as a "beater-bar", to agitate a carpeted surface to loosen dirt. The vacuum power head disclosed here requires at least two rotary agitators. On the disclosed designs the agitators rotate in opposite directions so that dirt may be swept into the area between them by the brushing action of the agitators. This dual agitator action is organized so that pulling and pushing on the vacuums handle causes one or the other rotary agitator to have greater traction than the other and thus create a net propelling force on the vacuum's power head. When the handle is pushed forward, more force is placed on the front roller and thus causes it to provide greater frictional contact. The difference between the friction [force] *forces* on the two rotary agitators determines the net force generated. Since the bottom of the front agitator rotates from front-to-back, greater contact force on this agitator causes a force to be generated in the forward direction. The rotary agitator literally drags along the floor or carpet, and pulls the vacuum forward. When the handle of the vacuum is pulled backward the rear rotary brush agitator is instead forced against the floor. This causes the vacuum to be pulled backward by greater friction force generated by the rear agitator, which is rotating in the opposite direction of the front agitator. The control of this self-propelling feature can be very precise if the vacuum is balanced properly. That is, the forces on each rotary agitator cancel when no force is placed on the vacuum handle (hose wand). If any small force is placed on the handle, this causes the vacuum's agitators to move the vacuum head in that direction. When the user stops pushing, the forces on the rotary agitators automatically adjust to bring the vacuum to a stop. Because of this moment by moment force adjustment of the vacuum, this self-propel feature can move the vacuum slowly or quickly depending on how fast the user tries to move the handle. This type of vacuum or power head attachment can be designed to be very sensitive to user applied force. The vacuum can be thought of as a positional drive, where the user simply moves their hand to where they want it to go and the vacuum moves to follow the user's hand. However, if the user moves their hand too quickly, the momentum of the vacuum can cause a delay in the vacuum changing direction. This momentum factor limits how fast the vacuum can react to the user. On carpeted floors the friction forces may be quite high which can allow the vacuum to have very fast reaction times.

BACKGROUND—DESCRIPTION OF PRIOR ART

Figure 3:
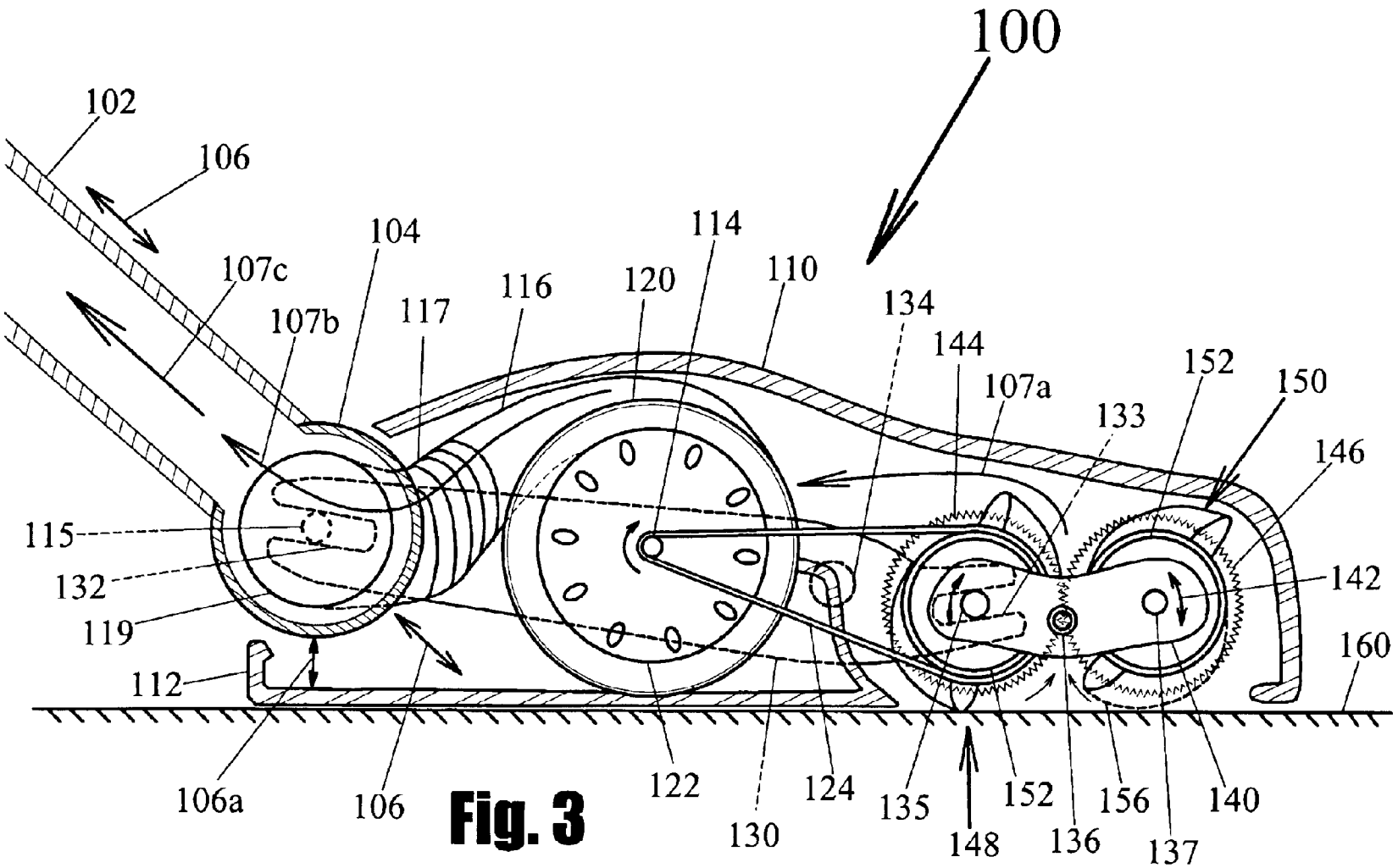
Figure 5:
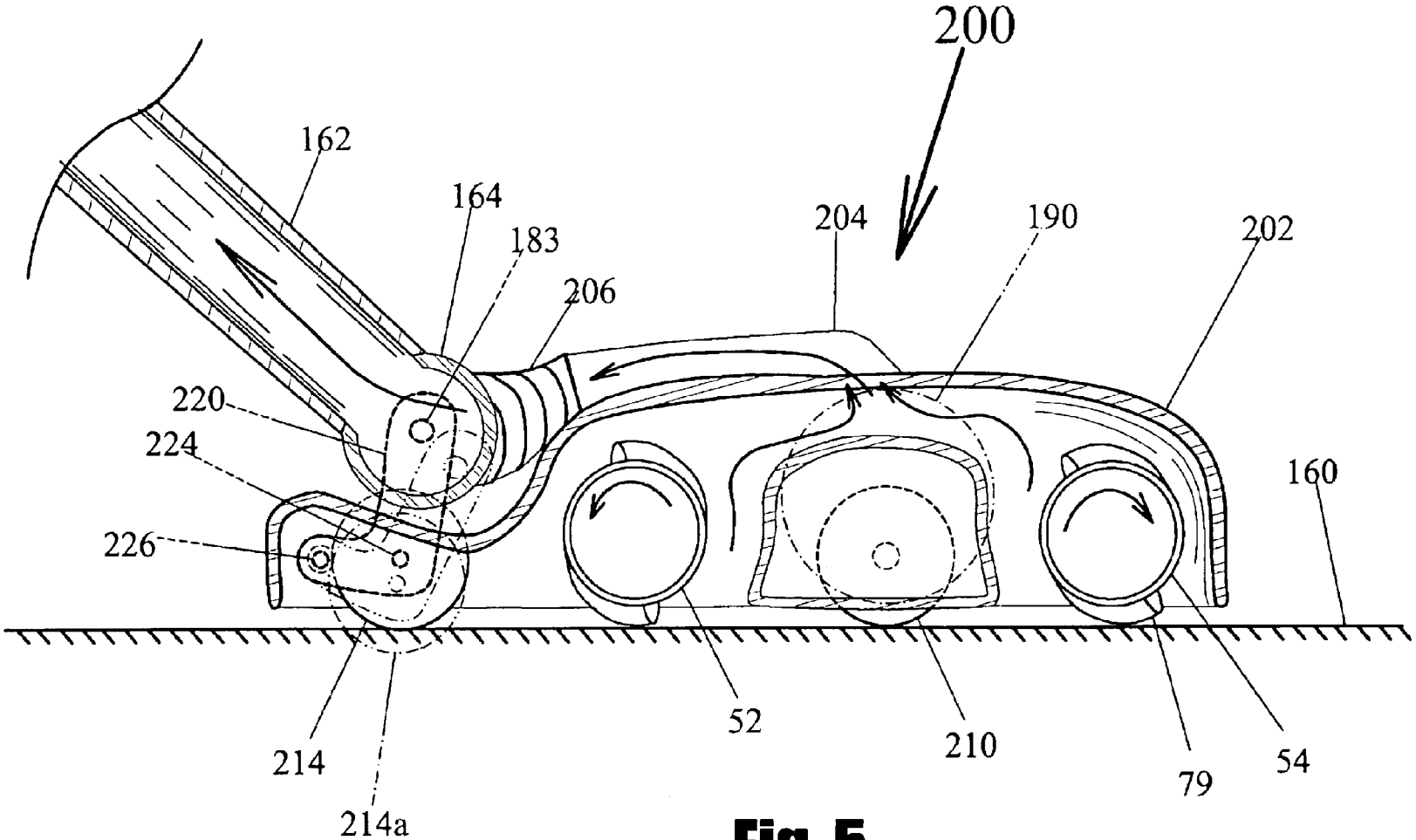

Vacuum cleaners with counter rotating rotary brush agitators where found in the prior art such as, U.S. Pat. No. 2,266,075 to Replogle, U.S. Pat. No. 3,220,043 to Lampe, U.S. Pat. No. 4,426,751 to Nordeen, U.S. Pat. No. 4,850,077 to Venturini, and U.S. Pat. No. 6,073,303 to Hinojosa. Many rug shampooers exist that use counter rotating brushes to cancel the forces generated by the scrubbing, and provide self-propelled function without lifting and lowering their handle, which provides a self-propelled assisted action similar to the Applicants, but are not designed to work in the environment of a vacuum cleaner where faster moving rotary agitators are used and suction pressure must be compensated for. Only U.S. Pat. No. 2,266,075 to Replogle, appears to provide a self-propelled function that uses only the agitator bars to provide propulsion. However, the design does not offer a way to make such a vacuum "low profile" as seen in FIGS. 3 and 5, which is a big advantage in today's market, nor does it describe a means for placement of both agitators substantially next to each other for better cleaning. U.S. Pat. No. 3,220,043 to Lampe, also shows *an* alternate contact for agitator brushes, but also [have] *has* drive wheels that make alternate contact with the surface being cleaned. This overly complicates the design compared to the Applicant's.

OBJECTIVES AND ADVANTAGES

Figure 2A:
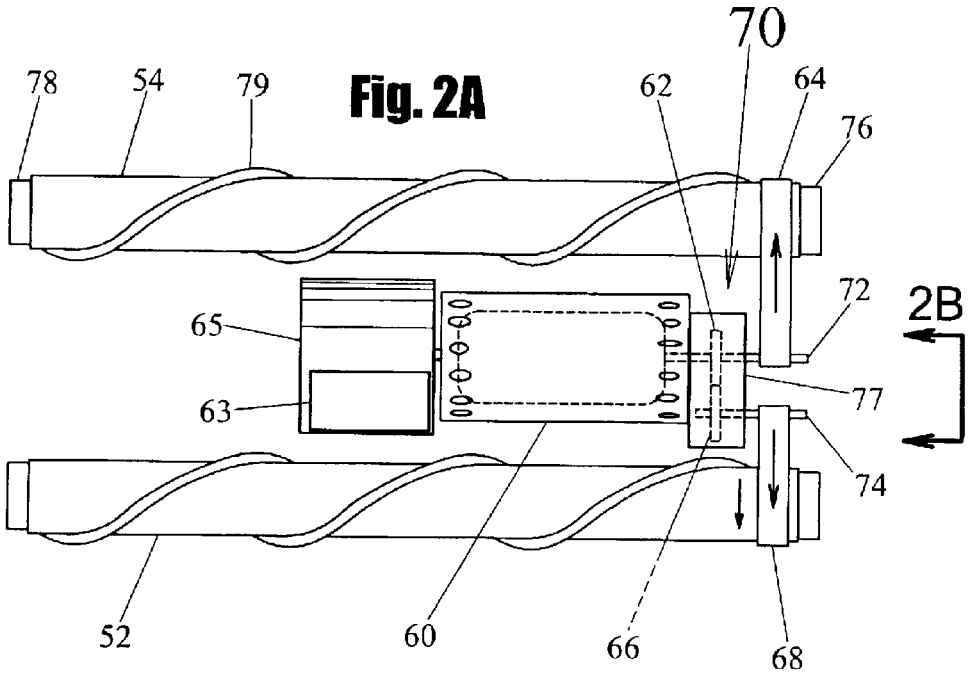
Figure 2B:
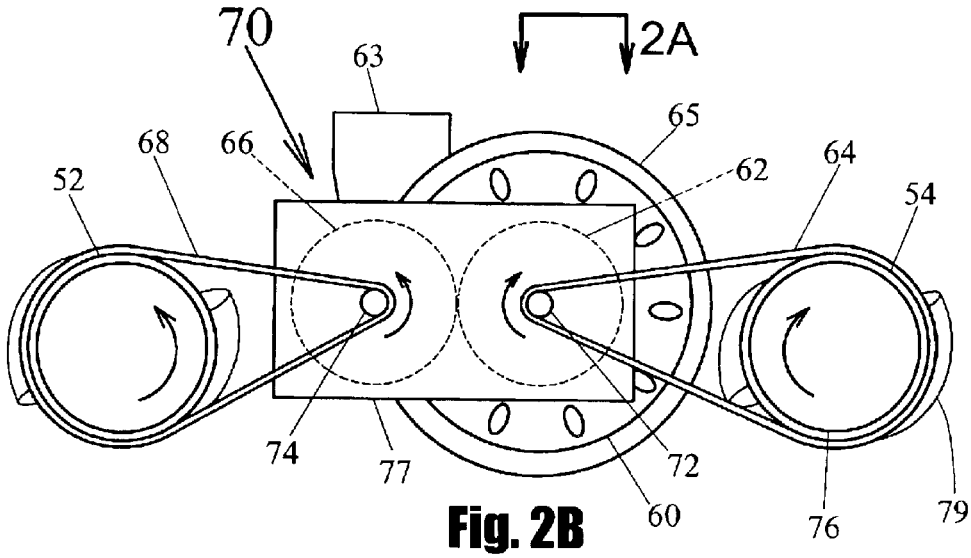
Figure 4:
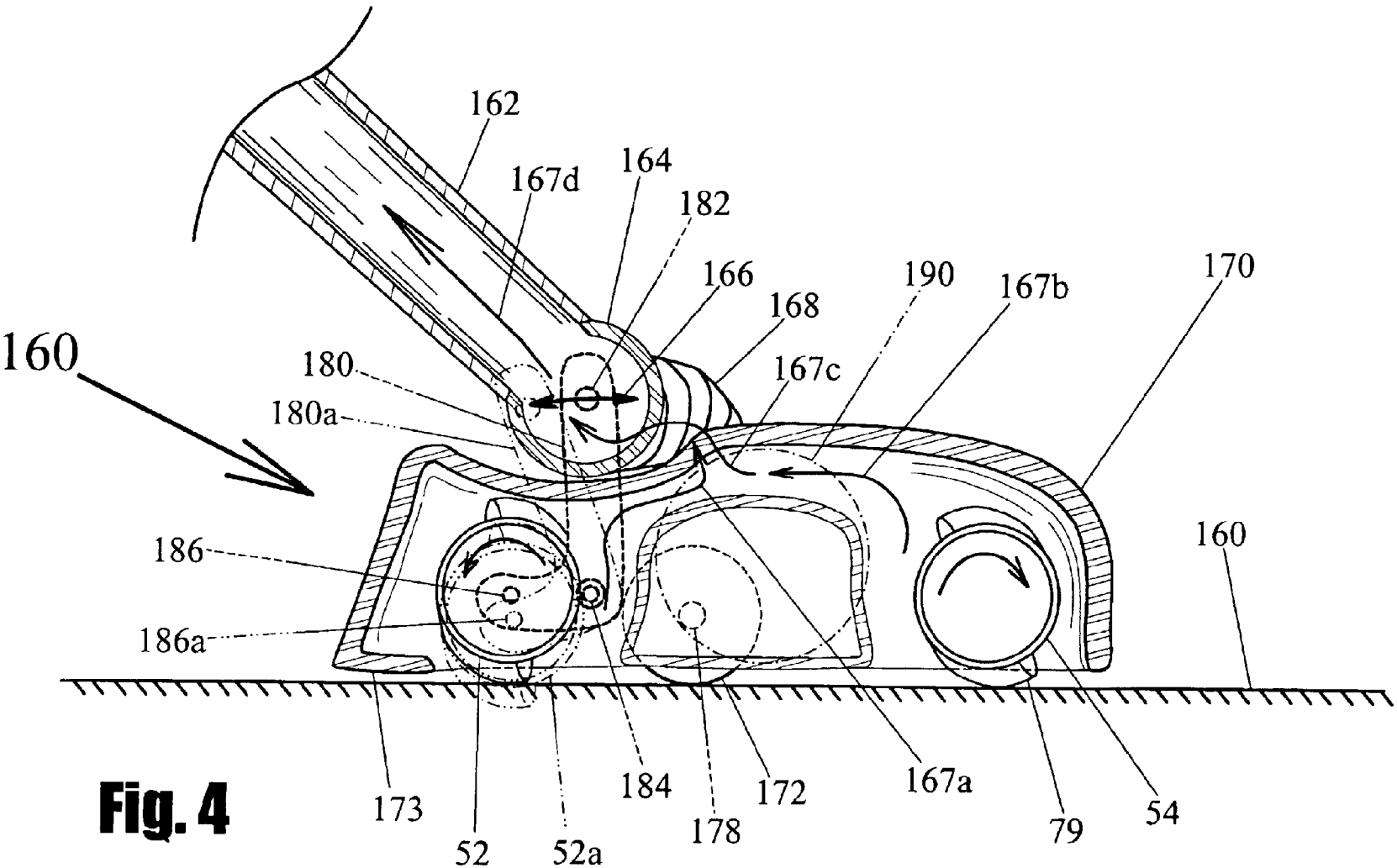

Accordingly, several objects and advantages of my invention are:

a) To provide a light-weight self-propelled vacuum cleaner and/or power head attachment.

b) To provide a self-propelled vacuum and/or power head attachment without the need for drive wheels, drive transmission or separate drive motor. Instead the vacuum uses the rotation of the agitators to provide locomotion.

c) To provide a vacuum and/or power head with counter rotating agitators where the agitator's contact friction force may be adjusted by the user by sensing the force on the vacuum's or power head's handle.

d) To provide a vacuum and/or power head with counter rotating agitators where the contact friction force is adjusted by pivoting of the power head portion of the vacuum cleaner (see FIGS. 1 through 2B).

e) To provide a vacuum and/or power head with counter rotating agitators where the agitator's contact friction force is adjusted by placing a pivot point between the agitators that allow them to rotate to different heights from a surface. This differential in height results in one agitator being in heavier contact with the surface and thus, creating the greatest propelling force (see FIG. 3).

f) To provide a vacuum and/or power head with counter rotating agitators where the agitators' contact friction forces are adjusted by moving one of the agitators in the vertical direction within the power head under the control of forces exerted on the handle of the vacuum (see FIG. 4).

g) To provide a vacuum and/or power head with counter rotating agitators where the differential drive force generated by the agitators may be adjusted by raising and lowering a support wheel. The support wheel position is controlled by the handle of the vacuum (see FIG. 5).

h) To provide a vacuum and/or power head with counter rotating agitators where the differential drive force generated by the agitators may be adjusted by pivoting the agitator assembly (agitators and drive motor) within the power head portion of a vacuum cleaner (see FIGS. 3, 6A–6C).

DRAWING FIGURES

FIG. 1 Vacuum cleaner with counter-rotating agitators for self-propelled operation. Self-propelled mode is controlled by pivoting of the entire power head.

Figure 1A:
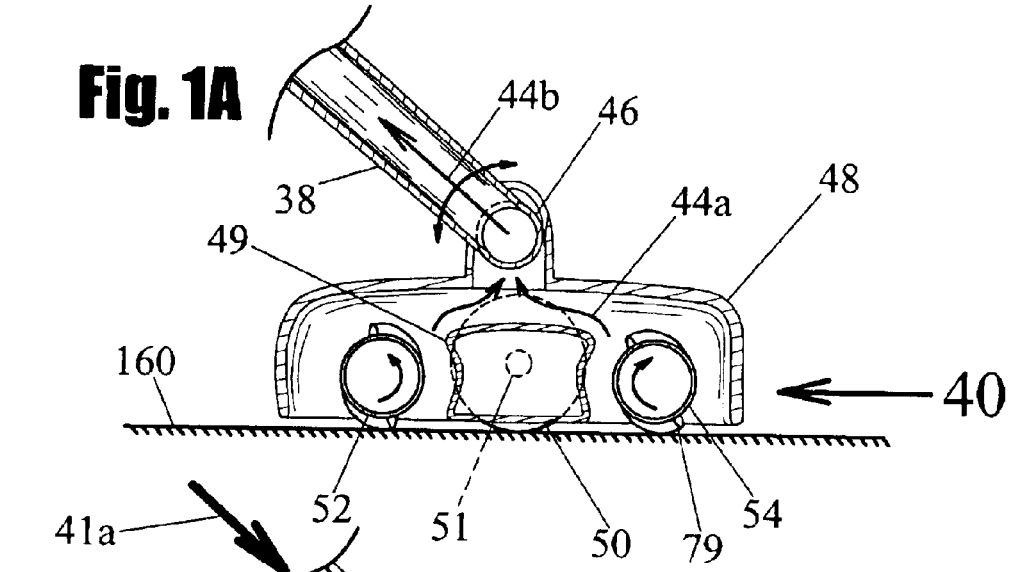
Figure 1B:
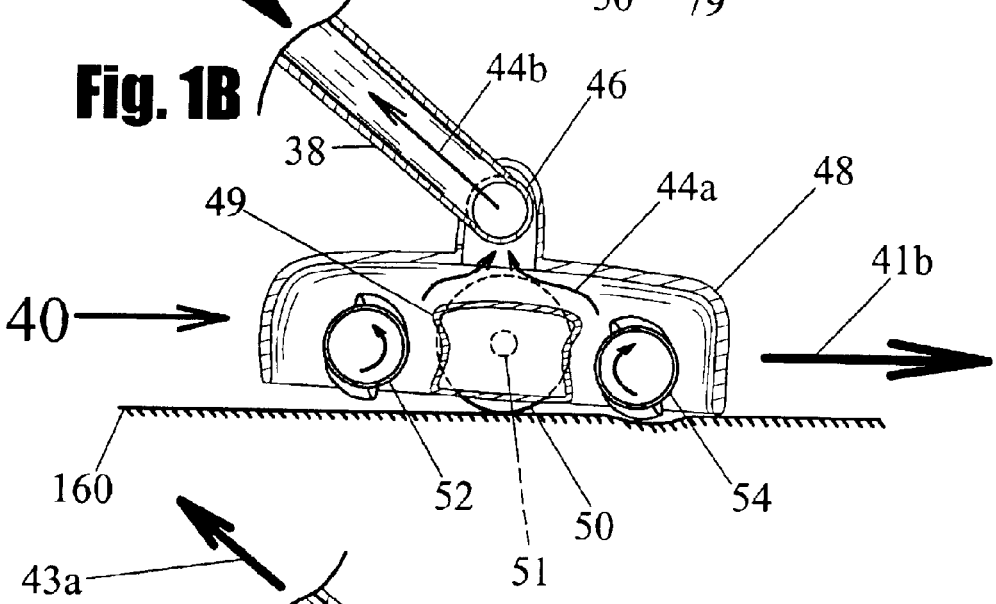
Figure 1C:
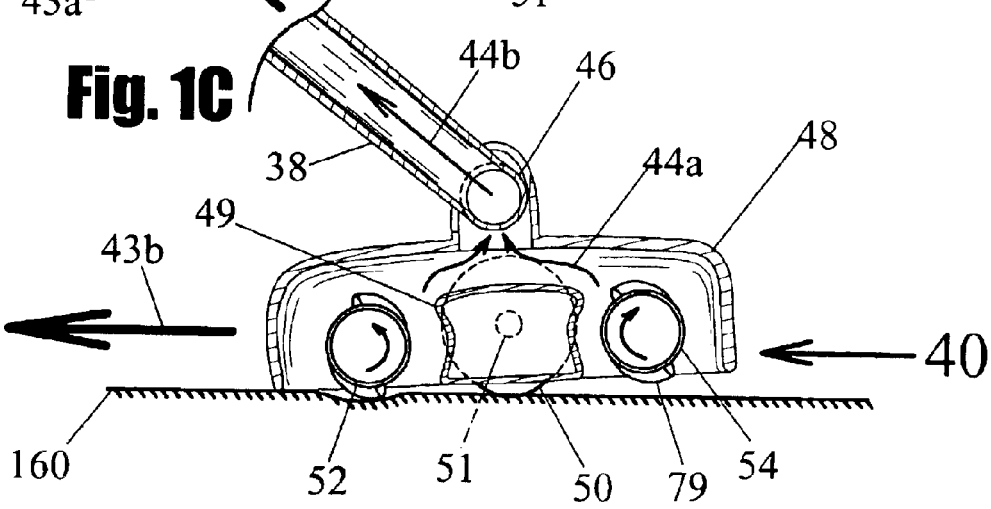

FIGS. 1A–C Vacuum cleaner with counter-rotating agitators shown in stationary, forward driven, and backward driven modes.

FIGS. 2A–B Agitators and motor drive for power head in FIGS. 1, 1A, 1B and 1C.

FIG. 3 Power head design with rear mounted pivot for handle portion. Self-propelled mode is controlled by pivoting the agitator assembly within the power head.

FIG. 4 Power head design with handle portion mounted to a pivot arm. Self-propelled mode is controlled by adjusting the height of only one of the agitators with respect to the power head.

FIG. 5 Power head design with handle portion mounted to control the height of a support roller. Self-propelled mode is achieved by adjusting the height of the support roller to change the proportional contact of the agitators with the surface being cleaned.

Figure 6A:
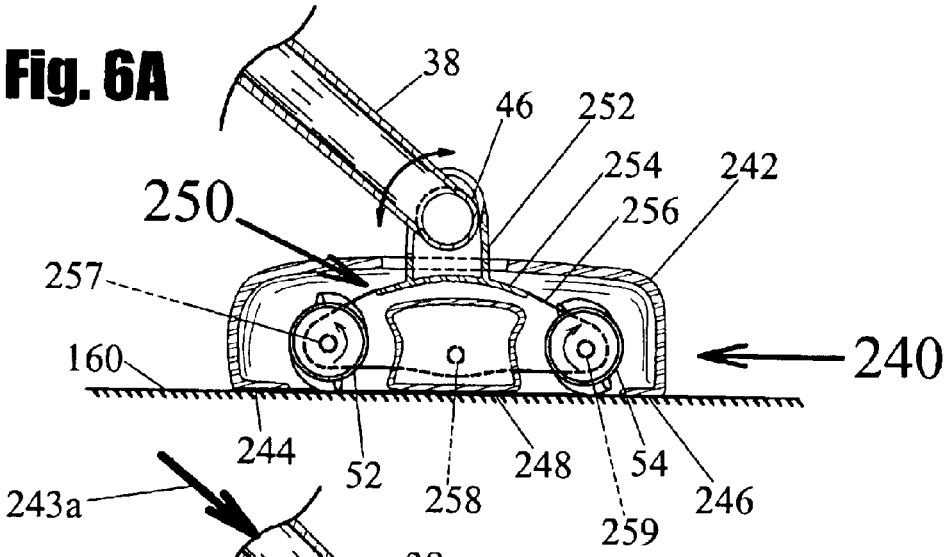
Figure 6B:
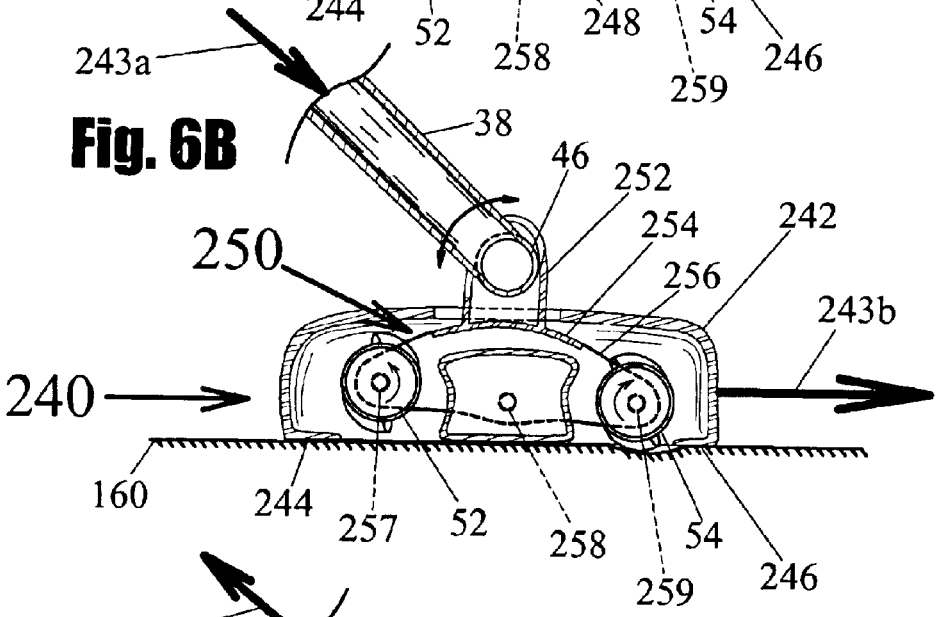
Figure 6C:
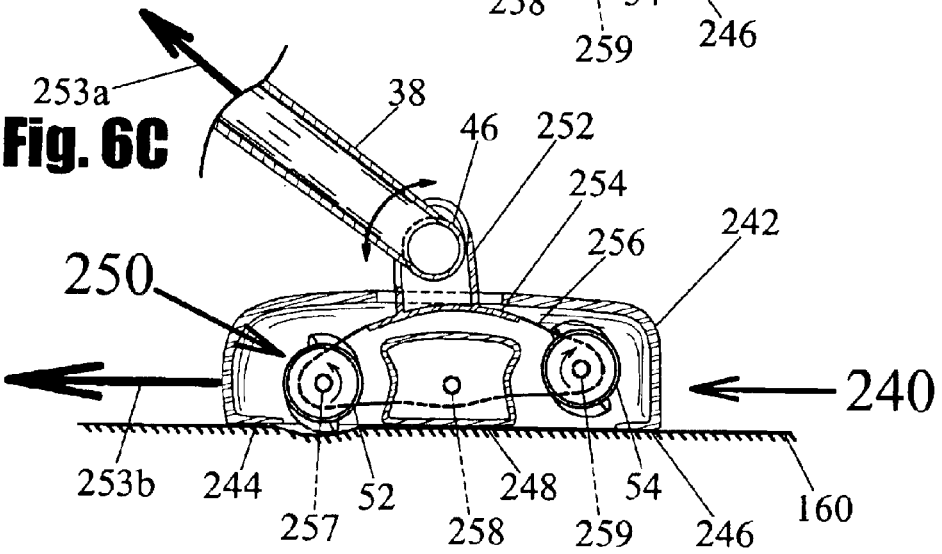

FIGS. 6A–C Power head design with handle portion mounted to a pivotable agitator assembly. Self-propelled mode is achieved by pivoting the agitator assembly to change the proportional contact of the agitators with the surface being cleaned.

DETAILED DESCRIPTION OF THE PREFERRED EMBODIMENTS

The use of vacuum cleaners for cleaning floors is well known. Vacuums are made in many different styles and types. A basic vacuum design includes a handle portion (which normally includes a dirt collection bag), and a vacuum power head. The power head generally comprises a rotary agitator, an agitator motor, and a pivoting attachment to the handle portion. This pivoting attachment sometimes includes an air conduit for passing dust from the power head to the collection bag. All the designs [show] *shown* here, show the air conduit built into the handle, however, a separate air conduit may easily be used to connect the collection bag and the power head. This would eliminate the need for the air conduit to pass through the handle pivot joint. The suction motor and suction fan that provide the airflow to transfer dust to the bag can be mounted in the handle portion or in the power head portion depending on the style of vacuum it is, or external to both the handle portion and power head, as in a central vacuum system. The disclosed invention deals with the power head portion of the vacuum and how the handle portion interacts with the power head. The suction fan and motor may be mounted within the power head or be located completely separate from the disclosed invention (such as when used with a central vacuum system where the suction vacuum is usually mounted in the user's garage or with a canister vacuum). Thus, the disclosed invention may be used on power heads with or without suction power built into the power head itself, so that it can be used with stand alone upright vacuums, canister vacuums, and/or central system vacuums (see FIGS. 4, 5 and 6).

The counter-rotating agitator designs shown here can be separated into two basic types: A) adjusting the position of both agitators (see FIGS. 1, 3, 5 and 6), and B) adjusting the position of only one agitator (see FIG. 4). Examples of these two types are shown in this patent, but do not represent a complete list of possible configurations, but some of the many possible ways the friction (traction or drag force) on the agitators can be controlled to provide self-propelled operation. FIGS. 1 through 2B show a vacuum power head that adjusts the contact friction of the agitators by pivoting the entire power head. FIG. 3 shows the agitators being adjusted by pivoting an agitator assembly within the power head though a linkage system. FIG. 4 shows the contact friction being adjusted by adjusting the position of just one of the agitators. FIG. 5 shows the contact friction being adjusted by raising and lowering a support roller wheel. And FIG. 6 shows a power head where a dual rotary brush agitator assembly (agitators, motor, transmission, belts and/or gears) is pivoted inside the power head housing to adjust the contact friction.

In FIG. 1 we see the disclosed invention designed into an upright vacuum cleaner 30. Power head 40 comprises a housing 48, an inner housing 49 (air channel system), a support wheel 50 and two agitator rotors 52 and 54, each with two or more brush strips 79. Agitator 52 is mounted in the rear and Agitator 54 in the front of power head 40 (this front/rear positioning is [maintain] *maintained* for FIGS. 1A through 2B). A fan motor and a suction fan (neither shown) are commonly mounted on the handle portion of the vacuum. However, power head 40 may include a vacuum motor and a suction fan within its housing (see FIGS. 2A, 2B, 3, 4, and 5) to provide suction air for cleaning. The vacuum motor and a suction fan are often combined with the agitator drive motor so that only one electric motor is needed to power everything (see FIGS. 2A and 2B). For clarity, the drawings in FIG. 1 and FIGS. 1A through 1C do not show the agitator motor drive assembly (seen in FIGS. 2A and 2B). The vacuum's handle portion is attached to power head 40 by pivot joint 46, which can rotate along an axis perpendicular to the plane of the drawing sheet. Pivot joint 46 also allows air to flow through it from the agitators and up hose extension 38 (hose wand). Hose extension 38 has an air outlet 36 which leads to a dirt collection bag 34. Dirt and dust 35 collects in this bag near the bottom. Handle 32 at the top of hose extension 38 provides the user with an easy to use grip.

In FIGS. 1 through 1C, vacuum 30 has been sectioned near its centerline to provide the shown side view. All the components have been sectioned along this centerline except agitators 52 and 54. For clarity, motor 60, suction fan 65, and transmission 70 have been removed from the drawings. Exterior housing 48 and inner housing 49 are sectioned to expose agitators 52 and 54 which are positioned as if the entire housing was there. The agitators rotate in opposite directions to provide better cleaning and also to provide both forward and backward self-propelled action. The front agitator 54 rotates clockwise (surface of agitator 54 moving backward where it is in contact with floor surface 160) and rear agitator 52 rotates counter-clockwise (surface of agitator 52 moving forward where it is in contact with floor surface 160) in FIGS. 1 through 2A. In the other Figures the front and rear agitators rotate in the same [directions] *direction*. While the self-propelled vacuum head could easily be made to operate with the agitators rotating in the opposite directions shown, this would be undesirable because dirt would tend to be kicked away from the center of the vacuum, and back out onto the floor. This would happen much less with the agitators rotating as shown in this invention. Inner housing 49 provides the air passageways for cleaning and also provides support for the motor and suction fan (both cut away in these drawings). Inner housing 49 may be designed to provide significant air suction in the areas between housing 49 and the agitators, so that objects sucked-up can move with the motion of brush strips 79. Support wheels 50 are mounted on each side of the power head at pivot bearing 51 to provide support for the power head and to provide a pivot point for the power head. This pivoting action allows differential pressure to be exerted on agitators 52 and 54 during operation. Only the left wheel 50 is shown in shadow in FIGS. 1–1C, since the right wheel has been cut away with the sectioning of the housing. The shown position of wheel 50 is for illustration only. The wheels' actual axis of rotation may be repositioned (mounted further forward or rearward) to provide the desired pivoting operation. The bottom portion of the housing 48 is designed to ride above surface 160 so that it can pivot forward and backward as seen in FIGS. 1B and 1C respectfully.

In FIGS. 2A and 2B we see the motor assembly for the vacuum cleaner seen in FIGS. 1–1C, (a top view in FIG. 2A, and a right side view in FIG. 2B). Housings 48 and 49 have been removed as well as other air conduit structures. The agitators 52 and 54 may be identical in design with mounting bearings 78 and 76. Brush strips 79 provide a beating action as the agitators rotate, and can comprise bristles and/or friction ridges. Electric motor 60 drives suction fan 65 and transmission 70. Suction fan 65 pulls air in from around agitators 52 and 54, and discharges the air through output port 63. The airflow is directed between the agitators and the suction fan 65 by the housings that have been removed in this drawing. Air from port 63 then flows into pivot joint 46, up handle 38 and into collection bag 34 (see FIG. 1). While this design uses rigid joints to transfer suction air, as we will see in later designs, a flexible hose can be used as an interface between the power head, and the handle and/or collection bag. Motor 60 also provides rotary power to transmission 70 to power the agitators. Transmission 70 comprises housing 77, gears 62 and 66, and their respective drive shafts 72 and 74, respectfully. Gear 62 and drive shaft 72 are driven directly by motor 60. Gear 66 and drive shaft 74 are driven by gear 62 to rotate in the opposite direction of gear 62. Thus, shafts 72 and 74 rotate in opposite direction when motor 60 is operating. Belt 64 is installed over shaft 72 and agitator 54 and designed to transfer rotary power to agitator 54 in the correct direction when the motor is operating. Belt 68 provides the same function for agitator 52, conducting rotational force from shaft 74 to agitator 52. Bearings 76 and 78 provide the mounting points for the agitators within housing 48. It may be desirable for bearing 76 to be better quality than bearing 78 since substantially more force is placed on bearing 76 because of the tension in belt 64 (belt 68 for agitator 52).

In FIG. 3 we see an alternative power head design 100, where the agitators are pivoted internally. Hose wand 102 leads to an upright vacuum design dirt collection bag similar to bag 34, but may be [connect] *connected* to a canister vacuum or central vacuum hose. If hose wand 102 is connected to an external suction air supply (central, or canister vacuum), then, motor 122 needs to only drive agitators 148 and 150 and can be made smaller than that needed power head 100. Agitators 148 and 150 can be identical in this design and are mounted next to each other. Motor 122 is large enough to drive a suction fan 120 (behind motor 122 in FIG. 3) and provide a suction airflow around agitators 148 and 150. The agitator assembly comprises: two agitators 148 and 150 (though more could be used) each having brush strips 156, bearings 152, and gears 144 and 146 respectfully, a support bar 140 on each side, a pivot hinge 136 on each side, an agitator connector with a rocker pin 135, and a agitator connector 137 on each support bar 140. Housings 110 and 112 provide covering for power head 100. Housing 112 is designed to slide along the surface to be cleaned and provide a stable distance between the floor 160 and agitators 148 and 150. Housing 112 may also include roller wheels (not shown) to help this sliding motion and to also move easier on hard surfaces. Motor 122 is mounted within housings 110 and 112, and drives a suction fan 120 and agitator 148 through shaft 114 and belt 124. The housings provide air passageways between the agitators and suction fan to allow dirt removal. The suction fan blows dirty air into output port 116 which is connected to flexible hose 117. Hose 117 connects to port 119 on pivot joint 104. Pivot joint 104 is connected to the bottom of hose wand 102 and is constrained by connecting pin 115 which is guided within grooves on housing 110 to be slidable in the direction of line 106. This arrangement provides a continuous air passageway from the agitators to hose wand 102 and ultimately to a dirt collection bag (not shown). Spring tension may be added to pivot *joint* 104 to provide the proper positioning and tension for motion 106. Pivot joint 104 pivots around connecting pin 115 which interacts with slot 132 on control arm 130. Pin 115 can [slid] *slide* within slot 132 to rotate arm 130 about pivot bearing 134. Slot 133 is defined on the forward end of arm 130 and interacts with pin 135, which is connected to the agitator assembly. Movement of arm 130 thus may adjust the orientation of the agitators. This pivoting action of arm 130 rotates the agitator assembly around pivot bearing 136 on support bars 140 in response to force placed on hose 102 by the user. The entire agitator assembly is attached to both sides of the housing at pivot hinge 136, which allows the assembly to rotate as shown by the small arrows 142. Support bars 140 on each end of the agitators[.] connect the agitators 148 and 150 together by their rotary bearings 152. Support bars 140 attach directly to the agitator bearings 152 to allow the agitators to rotate between them. Gears 144 and 146 attached to rotary agitators 148 and 150 respectfully and meshing so that power is transmitted from agitator 148 to agitator 150 and so that the agitators rotate in opposite directions. Brush strips 156 on each agitator helps cleaning by agitating surface 160 to loosen dirt. The agitator assembly is designed for substantially stationary operation with pivot hinge 136 positioned substantially in-line with rocker pin 135 and drive motor shaft 114. This in-line condition is the natural state for the assembly with tension from belt 124 pulling them in-line. This in-line arrangement reduces the amount of force needed to overcome belt tension when rotating the agitator assembly in either direction.

Power head 100 in FIG. 3 can be modified so that pivot joint 104 connects directly to rocker arm 130 at pin 115. Pin 115 would pivot in a bearing joint which would replace slot 132, and guides in housing 110 would be designed to allow pivot joint 104 to move along direction arrows 106a. This arrangement still allows force from hose wand 102 along direction arrows 106 to rotate pivot bar 130 around pivot bearing 134 and thus pivot the agitator assembly. Note that housing 112 will need to be modified slightly to make room for this new vertical motion of pivot joint 104.

In FIG. 4 we see an alternative design where one adjustable agitator 52 is used to adjust the self-propelled function for power head [160] *170*. Power head [160] *170* is attached to a pivot joint 164 and suction hose wand (or hose wand) 162 similar to other handle portions seen this patent. This design shows a power head for use with canister vacuums, central vacuum systems and the like without an onboard vacuum fan, however the design can easily add a larger drive motor with a suction fan to provide its own vacuum air supply. Agitator drive motor 190 is shown in phantom lines, and drives rotary agitators 52 and 54 through belts or gears similar to the method shown in FIGS. 2A through 3. The same agitators 52 and 54 can be identical and are used here to point out how industry presently uses a number of standard agitator designs that are interchangeable between many different vacuum cleaners. Housing 170 is designed to provide air passageways so that air can flow from the agitators along lines 167a and 167b to flexible hose 168 along line 167c and eventually to suction hose 162 along line 167d. Flexible hose 168 allows pivot joint 164 to move along line 166 and still provide a clear air passageway from the power head to suction hose 162. The movement of pivot joint 164 is controlled by a pair of pivot arms 180 (only left side shown in shadow behind pivot joint, right side pivot arm cut away in section). Pivot arm 180 pivotally attaches to joint 164 at pivot bearing 182. Pivot arm 180 is mounted to the housing at pivot bearing 184, and connects agitator 52 to it at pivot bearing 186. Thus, suction hose 162 when moved, causes agitator 52 to raise and lower within housing 170. Arm 180 may move to alternate positions (see example position 180a) where agitator pivot position 186a is lowered toward surface 160 to force agitator 52 onto the surface at alternate position 52a of agitator 52. Support roller 172 pivots on bearing 178 and is positioned near the rear agitator 52 so that when agitator 52 is lifted from surface 160 agitator 54 remains in contact with the surface. Pivot bearing 178 is positioned so that forces exerted down suction hose 162 (user pushing forward) are directed in front of bearing 178 so agitator 54 is kept in contact with surface 160 to provide forward propulsion. Agitator 54 may be mounted in a fixed location on the housing or may be spring loaded to provide a more constant downward force on the surface. Arm 180 may also be pre-loaded with a spring (not shown) to compensate for the weight of the suction hose 162 and pivot joint 164 so that little or no force is needed on the handle to hold power head 160 in one position during use. In general, there is not much need for spring loading if pivot 182 is place directly above hinge 184, when agitator 52 is positioned for stationary operation. In this way, the weight of the suction hose is supported by hinge 184 and produces very little torque on arm 180. Some spring tension may be added to counteract the force exerted by agitator 52 on arm 180 (equal downward force is needed on agitators 52 and 54 to balance traction forces against surface 160). Landing surface 173 on housing 170 provides support for the housing when agitator 52 is raised.

In FIG. 5 we see an alternative power head design 200. This design shows a power head for use with canister vacuums, central vacuum systems and the like without an onboard vacuum fan, however the design can easily add a larger drive motor with a suction fan to provide its own vacuum air supply. Movable support roller wheels 214 on each side of the power head are used to adjust the contact force of agitators 52 and 54 with respect to surface 160. For this design agitators 52 and 54 and drive motor 190 are attached directly to housing 202. Roller wheels 210 on each side of the power head (right side cut away) helps support the agitators and also provide a pivot axis for the agitators and housing 202. Motor 190 may be connected to a suction fan to provide suction within power head 200 if desired. If a suction fan is driven by motor 190, generally more power will be need than if the motor rotates just the agitators. The agitators are mechanically connected to drive motor 190 similarly to the design in FIGS. 2A and 2B. Gears and other power transfer systems may also be used to transmit power from the motor to the agitators. The method of transferring power to the agitators is not important to this invention. In fact, the agitators may have a motor built directly into it so that no power transfer system is needed at all, as is done in some vacuums. A continuous air channel is formed by housing 202, channel 204, flexible hose 206, pivot joint 164 and suction hose 162, leading from the agitators to the exit on suction hose 162. Pivot arms 220 (only left arm shown, right arm cut away) attaches pivot joint 164 at pivot pin 183, to housing 202 at pivot bearing 226. Arm 220 also attaches to support roller 214 to housing 202, which is movable in response to movement of suction hose 162 which is attached to arm 220. Arm 220 provides a leverage advantage to roller 214 so that the rear portion of housing 202 may be raised by pushing suction hose 162 forward (magnitude of movement of roller 214 is exaggerated for clarity).

In FIG. 5, roller position 214a shows an alternate position for roller 214 which would raise agitator 52 off surface 160 and simultaneously force agitator 54 against surface 160. The drawing shows wheel position 214a below surface 160 for the motion of lever arm 220, this is to simplify the drawing since showing housing 202 and all the components within it in an alternate raised position would make the drawing messy to read. Spring tension may be added to lever arm 220 to provide the proper tension during operation, and provide little or no force needed on hose 162 to hold the vacuum stationary during operation.

In FIGS. 6A through 6C we see an alternative power head design 240. In this design, housing 242 is designed to glide along floor surface 160. Surfaces 244, 246, and 248 provide a relatively flat sliding surface for the housing. Rollers may also be added on any these bottom surfaces to assist in the movement of the housing along floor surface 160. Within housing 242 [a] *an* agitator assembly is pivotally mounted to the housing at pivot pin 258. The agitator assembly comprises agitators 52 and 54, support structure 256 on both sides, connecting support 254, hinge connector 252, and the powered equipment (motor, fan and transmission not shown in FIG. 6, but may be similar to that in FIGS. 2A–B) to rotate the agitators in opposite directions as shown by the arrows on the agitators. Pivot hinge 46 is positioned so that user force coming straight down hose 38 passes in front of pivot hinge 258 (repeating: the projected line of force parallel to hose 38 passes in front of pivot hinge 258). This positioning causes the agitator assembly to pivot forward (clockwise) when the user pushes forward on suction hose 38 (handle) and pivot backward (counter-clockwise) when the user pulls backward on suction hose 38. The proper positioning of pivot joints 46 and 258, thus, allows a pivoting action of the agitator assembly [withing] *within* housing 242. This pivoting can generate a differential traction from agitators 52 and 54. This difference in downward force on the two agitators with respect to surface 160 causes a difference in traction between the two agitators, which provides a net forward or backward force to self-propelled the power head. While the drawings in FIGS. 6A–C show one method of linking the forces exerted by suction hose 38 to pivot the agitator assembly there are many ways this can be done. For example, if the connection point of pivot joint 46 is desired to be placed near the rear of power head 240 (near agitator 52) this may be done with a simple lever arm similar to those seen in FIGS. 3, 4, and 5. The pivoting of the agitator assembly would then be accomplished by leveraging some point on the assembly to pivot it in the proper direction. For example, if one wanted to specifically leverage the assembly near rear agitator 52 then a lever arm similar to arm 130 in FIG. 3, though much shorter and with the pivot point for the lever arm located between pivot joint 46 and its connection to the assembly. Numerous other ways exist for mechanically providing the actuation of the agitator assembly to produce propulsion.

Operational Description—FIGS. 1 through 6C

The operation of all the designs disclosed here centers around providing control over the differential traction between two counter-rotating agitators. By providing the proper control over this differential traction one can use it to propel (self-propel) the vacuum or power head in the direction the user pushes. The user's force exerted on the design is amplified by the sensitivity of agitator brushes to the contract pressure exerted on them. Thus, a small user force linked to one of the agitators can generate significant traction on carpets so that the agitator easily propels the vacuum. While all the vacuums/power head examples disclosed here produce their self-propulsion from the counter-rotating agitators, the specifics of how they control the differential traction is different. The control of the agitators can be separated into two basic types: A) those that adjust both counter-rotating agitators (see FIGS. 1, 3, 5, 6), and B) those that adjust one of the counter rotating agitators (see FIGS. 4—note that agitator 54 is still slightly effected by forces exerted on hose wand 162). The adjustment of both agitators has an advantage over the single agitator adjustment because when one agitator is increasing traction force, the other agitator can be decreasing traction force so that a greater net traction force can be generated. In the following section the operation of specific examples will be discussed.

The vacuum in FIGS. 1 through 1C has the simplest construction of all the designs presented here. Power head 40 operates as a single unit, with its components remaining fixed with respect to each other during operation. Roller wheels 50 [is] *are* designed to support most of the downward force created by power head 40. Suction air flowing around agitators 52 and 54 may cause housing 48 to pulled down onto surface 160 with considerable force. Steps can be taken to reduce the vacuum suction under the housing, but some vacuum suction is needed for the power head to clean properly. Thus, wheels 50 should be places relatively near the "center of pressure" on the housing so that agitators 52 and 54 experience approximately even force pressing them onto surface 160 (when the user is not pushing or pulling on handle 32). In FIG. 1A, during operation with power head 40 in a stationary position, the vacuum needs very little force on the handle to hold it in place. Agitators 52 and 54 are both striking surface 160 with approximately the same downward force and generating approximately the same traction force away from each other so that they cancel each other out. The traction force on the agitators can be quite large in this stationary operation, but the agitator's counter-rotating design substantially equal and opposite traction forces so that they cancel (see FIG. 1A).

In FIG. 1B we see the same vacuum power head 40 with the user pressing lightly forward with force 41a on handle 32 (see FIG. 1). This small force 41a, directed down suction hose 38, causes housing 48 to experience a forward pivoting force around bearing 51. Pivot joint 46 is located above wheel 50 so that force 41a produces a clockwise torque around pivot bearing 51. At the same time, the contact force of agitator 54 onto surface 160 increases and the contact force on agitator 52 decreases. This creates an imbalance of traction forces on the agitators, and a net forward directed force 41b is generated which propels the power head forward.

When the user pulls backward on the handle, as seen in FIG. 1C, the power head pivots backward around bearing 51. Again the location of pivot joint 46 allows force 43a to create a counter-clockwise torque around pivot bearing 51. This torque is used to force agitator 52 against surface 160 to generate traction, while at the same time, agitator 54 is raised, thus reducing its traction. The result is a net backward directed force 43b, which propels the power head backward.

Many things can be adjusted on power head 40 to provide optimized operation for specific uses. For example, the location and size of support wheel 50 may be modified to work best with the location of pivot joint 46. Support wheel 50 may also be placed in a different location to compensate for asymmetric suction air force on the housing. And of course, many different methods of linking the user applied force to create differential contact force for the agitators. Some of these methods are shown in FIGS. 3 through 6. Many other methods also exist, specifically the front and rear agitators can rotate in reversed directions and still operate (with modified control linkage) since it is the opposed rotating agitators that allows it to produce a differential force in either direction (forward and backward). Thus, as long as the two agitators are rotated in opposite directions, applied force from the hose wand can be used to adjust the agitator(s) to generate the properly directed net traction force.

The reader should note that the operation of these types of self-propelled assisted vacuum is not [a] *an* on/off type of propulsion. Instead, the amount of self-propulsion is directly related to the amount of force the user puts on the vacuum handle. The rotating agitators amplify the user applied force, and through proper geometry of its components, [amplifies] *amplify* it to propel the vacuum in the direction of the user applied force. Thus, power head 40 moves with the user, responding slowly if the user moves slowly and quickly if the user moves quickly.

In FIGS. 2A and 2B we see the motor drive system within power head 40. During operation motor 60 turns both agitators 52 and 54, and suction fan 65. Suction Fan 65 may be driven directly by motor 60. Agitators 52 and 54 are driven by power transfer from motor 60 through transmission 70 and drive shafts 74 and 72, and then by belts 68 and 64 respectfully. Gear 62 is directly powered by the motor, and gear 66 is driven by gear 62 in the opposite direction. This provides power output to shafts 72 and 74 which turn in opposite directions. While cleaning, air is sucked from around agitators 52 and 54 and pulled through suction fan 65. This dirty air is then discharged through output port 63 for transport to the collection bag. Air from port 63 travels to pivot joint 46, up through air channel 42 in suction hose 38, through outlet 36 and into dirt collection bag 34, where the air is filtered of its dirt and cleaned air passes through the walls of the bag. Of course, other dirt collection containers and separators can be used, such as, bag-less or cyclone type systems.

In FIG. 3 we see an alternative design for power head 100 for a vacuum cleaner. Power head 100 may include a suction fan 120 driven by electric motor 122 in which case no external air suction source is needed. If motor 122 only powers the rotary brush agitators 148 and 150 then an external air suction source will need to be connected to suction hose 102. However, the placement of the suction fan does not [effect] *affect* the essence of the disclosed invention, which involves the use of counter-rotating rotary agitators to self-propel the power head, and is only mentioned here for clarity and completeness. For this design, suction fan 120 provides vacuum airflow from the agitator area along airflow path 107a. Airflow along path 107a then passes through suction fan 120 and out through channel 116, flexible hose 117, and pivot joint 104 along airflow path 107b. Finally, the airflow continues out through hose wand 102 along airflow path 107c.

During operation of power head 100, motor 122 turns shaft 114 which moves belt 124, which turns rotary agitator 148. Gear 144 on agitator 148 interacts with gear 146 connected to agitator 150, to turn agitator 150 at approximately the same rate as agitator 148. When no force is placed on hose wand 102, the linkage between pivot peg 115 and the agitators is designed to position the agitators so that their traction forces substantially cancel. When the user puts a small force on wand 102, pivot joint 104 may move in and out as shown by arrows 106 (or 106a in modified version). When pivot joint 104 moves, peg 115 interacts with slot 132 and pivots lever arm 130 around pivot bearing 134. The mechanical advantage of lever arm 130 allows a small force at peg 115 to produce a much larger force at pivot peg 135. This causes the agitator assembly (agitators 148 and 150, support 140, hinge bearings 136, and pivot peg 135) to rotate about hinge bearings 136 as shown by arrows 142. This rotation[,] causes one agitator to move into greater contact with surface 160 as the other agitator moves into less contact with surface 160, and thus, provides self-propulsion. For example, in FIG. 3, pushing hose 102 forward forces peg 115 downward to rotate lever arm counter-clockwise about bearing 134. This causes slot 133 to lift up on peg 135 raising agitator 148 away from surface 160, while at the same time lowering agitator 150 into greater contact with surface 160. This creates a difference in traction force between the two agitators and their traction forces no longer cancel. The greater contact force of agitator 150 causes a greater traction force so that there is a net force to propel power head 100 forward. When the user pulls backward on hose 102, lever arm 130 rotates in the opposite direction and agitator 148 is lowered and agitator 150 is raised away from surface 160. Thus, the traction on agitator 148 is greatest and the power head is propelled backward. For the design shown in FIG. 3, housing section 112 provides a low friction surface that slides easily against surface 160. Generally, rollers (wheels) would be included on the bottom of power head 100 to reduce sliding friction, such rollers are not shown here to keep the drawing readable, but is a common practice in the art of vacuum head design. The less sliding friction that exists on power head 100 the better the differential traction from agitators 148 and 150 can propel the vacuum (upright vacuum, power head, or power wand).

In FIG. 4 we see another alternative dual-agitator vacuum head where the agitator's traction (friction) with surface 160 may be individually controlled. In this design, agitator 54 is stationary with respect to housing 170, while agitator 52 is movable. During operation pivot joint 164 and hose 162 can rotate lever arm 180 about its axis bearing 184. Lever arm 180 is designed so that agitator 52 is raised when hose 162 is pushed forward and lowered when hose 162 is pulled backward. Thus, when the user pushes forward on hose 162, agitator 52 is lifted away from surface 160 and the force from the user tends to rotate housing 170 forward and press agitator 54 onto surface 160. The position of roller wheel 172 provides the axis for this rotation. This results in an added traction force on agitator 54 that helps propel power head 160 forward for the user. When hose 162 is pulled backward, lever arm 180 rotates to force agitator 52 into surface 160. This creates traction for agitator 52 while the backward force on hose 162 tends to lift agitator 54 away from surface 160. The result is a net traction force propelling power head [160] *170* backward with the user's pulling.

The design in FIG. 4 may be adjusted in many ways to provide optimum operation. For example, by moving wheels 172 and the position of agitators 52 and 54 with respect to each other, better traction control may be [achieve] *achieved*. If wheel 172 is moved forward so that its axle 178 is substantially in-line with the direction of applied force down hose wand 162, then pushing and pulling on the hose wand by the user will have very little effect on the contact force of agitator 54 on surface 160. Thus, agitator 54 would have a relatively constant traction force, and raising and lowering agitator 52 would be used to adjust the net traction force, either forward or backward respectfully by adjusting the traction force on agitator 52 alone. Arm 180 amplifies the force exerted by the hose wand on agitator 52 so that very little force need be exerted on hose wand 162 to adjust the position of agitator 52. Also, the lever arm need not control the rear agitator, but may instead control the front agitator 54. Controlling the front agitator may provide many advantages for some designs. Also additional roller wheels may be added to assist the control over traction of the agitators. For example, another roller wheel pair may be attached to the housing in front of agitator 54. This provides a second pivot point for the housing which can help with backward propulsion. When hose 162 is pulled backward (lowering agitator 52) the rear portion of housing 170 is raised. If an additional wheel set is in front of agitator 54 then this rotation will tend to lift agitator 54 away from surface 160 by rotating about this new wheel set. Many other possible configurations are also possible.

In FIG. 5 we see another alternative dual-agitator vacuum head where the agitator's traction (friction) with surface 160 is controlled by a movable roller wheel 214. Wheel 214 moves in the vertical direction in response to movement of lever arm 220. Lever arm 220 is controlled by movement in hose 162 and pivot joint 164 through pivot pin 183. During operation, when the vacuum is held stationary, agitators 52 and 54 just make contact with surface 160 and produce approximately the same traction force so that no net propulsion force exists. Arm 220 amplifies the force exerted by the hose wand on wheel 214 so that very little force need be exerted on hose wand 162 to adjust the agitators' positions. As hose wand 162 is pushed forward, lever arm 220 rotates and forces wheel 214 against surface 160 and lifts-up the rear portion of housing 202. This tends to rotate power head 200 around support wheel 210. Since the agitators in this design are attached directly to the housing they pivot with the power head. This results in agitator 54 being pressed into surface 160 and agitator 52 being lifted away from surface 160. This generates a traction force differential between the two agitators and a net force is created that propels the power head forward in the direction of the user's applied force. When hose wand 162 is pulled backward, wheel 214 is lifted off of surface 160. This causes the power head to be supported only by wheel 210 and agitators 52 and 54. Housing 202 can be designed so that greater vacuum pressure force exists rearward of wheel 210 than forward of wheel 210 (though more airflow may be on the forward end). This means that once wheel 214 is lifted from surface 160 the power head tends to rotate counter-clockwise because of the greater downward suction on the rear half of the power head. This rotates the housing backward and forces agitator 52 into surface 160 while at the same time lifting agitator 54 away from surface 160. This causes the rear portion of housing 202 to lower itself nearer surface 160. While pulling backward on lever pin 183 notice that a portion of that force is trying to lift-up on the rear portion of housing 202. This upward force is easily countered by the large forces that may be generated by vacuum suction under housing 202. Thus, the area rearward of wheel 210 need only be slightly larger than the area forward of wheel 210 for the suction force to be significantly greater rearward of support wheel 210 than in front of it. This means agitator 52 will be pressed strongly against surface 160 even when hose wand 162 is pulled upward on strongly. Notice that the natural tendency of this design is to lift the housing on the side opposite the desired direction of motion. That is, when moving backward, the front of housing 202 is lifted. This reduces vacuum pressure on that side of the vacuum because of the larger airspace between surface 160 and the housing. Thus, the design in FIG. 5 tends to generate greater suction force downward for housing 202 on the portion that needs it (correct agitator forced against surface 160). Additional skirting (not shown) may also be added around this design to provide a consistent vacuum seal around housing 202. This skirting could make the vacuum pressure forces more consistent while power head 200 is pivoted about wheel 210. Also note that this control arrangement will work with the two agitators much closer together, such as, both near the front as in FIG. 3. Pivoting of the body will still tend to create a traction difference between the agitators.

In FIG. 6 we see another alternative dual-agitator vacuum head where the agitator's traction (friction) with surface 160 is controlled by a pivotable agitator assembly 250. For this design, housing 242 is in contact with surface 160 and supports then entire power head 240. Housing 242 supports the power head on sliding surfaces 244 and 246 which may include roller wheels or other friction reducing structures. Housing 242 also controls the amount of air bled under the housing so that the vacuum pressure is somewhat controlled. This helps maintain a consistent vacuum force downward on the housing. During operation, agitators 52 and 54 rotate in opposite directions and produce approximately equal and opposite traction forces when no force (no force on hose wand 38) is applied by the user (see FIG. 6A). When the user presses forward (force 243a) on hose wand handle 38, agitator assembly 250 rotates forward as seen in FIG. 6B. This rotation presses agitator 54 into surface 160 while at the same time lifting agitator 52 away from the surface. The result is a net force 243b, generated by the agitators against surface 160, to propel power head 240 forward. Similarly, when the user pulls back (force 253a) on hose wand handle 38 (see FIG. 6C), the agitator assembly rotates counter-clockwise. This forces agitator 52 against surface 160 and lifts agitator 54. The resulting net force 253b propels the power head backward. Support structures 252, 254, and 256 on agitator assembly 250 acts like a lever arm to pivot the agitators into, and away from, surface 160. This lever arm action may be modified by adjusting the positions of pivot bearing 258 and pivot joint 46. Additional linkages can also be included to allow pivot joint to be located anywhere on housing 242. Also, the location of agitators 52 and 54 may be modified. In general, the closer together agitators 52 and 54 are placed to one another the greater the leverage created to generate a differential force against surface 160. Thus, if both agitators 52 and 54 where placed side by side near the center of housing 242 a very small force on pivot joint 46 would create a large difference in contact forces for the agitators. This in turn would generate a large net traction force to propel the power head.

Ramifications, and Scope

The disclosed self-propelled power head solves several long standing problems for the vacuum cleaner industry, such as, allowing a light-weight self-propelled vacuum to provide better cleaning with two counter rotating agitators, providing exact self-propelled motion control in a light-weight system, and providing assisted self-propelled motion without heavy transmissions, clutches or electronic controls.

Although the above description of the invention contains many specifications, these should not be viewed as limiting the scope of the invention. Instead, the above description should be considered illustrations of some of the presently preferred embodiments of this invention. For example, while all the designs shown in this patent use mechanical linkages to control the differential pressure on the agitators, this need not be the only way it is done. For example, each of the designs in FIGS. 3, 4, 5, and 6A–C can be controlled by an electric actuator, solenoid, positioning motor, or other similar control device. Instead of mechanical linkages, a sensor in the vacuum's handle may sense the direction the user is pushing and move the agitator assembly (FIGS. 3 and 6A–C), single agitator (FIG. 4), control rollers (FIG. 5), or other means to adjusting the position and forces on the agitators. This electronic type of control can allow more choice as to how the agitators are controlled. For example, the front agitator may be adjusted by an electric actuator. Normally the front agitator is difficult to get to because of the drive system and because the handle portion is usually attached near the back of the power head to allow the handle to lay flat when going under furniture. Finally, many aspects of the designs may be adjusted to fine tune the performance of the system. For example, the agitator drive system may be designed to produce greater torque than standard vacuums for the specific purpose of accelerating the power head (vacuum cleaner) more quickly, and/or to keep the agitators from bogging down on the surface being cleaned. Many other adjustments to the support roller positions and size, and the location of all the power head's components may be moved to different locations depending on the desired needs of the user (i.e. low profile to get under furniture, etc.). Springs and other tensioning devices can be used in many ways to provide balanced traction force on the agitators. For example, in FIG. 3 if motor 122 and fan 120 pivot with agitators 148 and 150 then tensioning springs can be used to help support the weight of motor 122, fan 120 and hose wand 102, so that agitator friction forces are nearly balanced when the user applies no force to the handle of hose wand 102. Finally, the five different ways of controlling rotary agitator traction are shown in FIGS. 1 through 6. These methods may be mixed and matched or combine with other designs to create new ways for producing the desired control over the vacuum's self-propelled assist feature.

Thus, the scope of this invention should not be limited to the above examples but should be determined from the following claims.

I claim:

1. A vacuum power head for cleaning, comprising:

[a)] a housing having [a] front and rear [portion] *portions*;

[b)] an agitator assembly with a front rotary agitator and a rear rotary agitator;

[c)] an electric motor;

[d)] a power transfer means for transferring rotary power from said electric motor to said front and rear rotary agitators;

[e)] a suction conduit having an entrance and an output port;

[f)] a hose wand;

[g)] a lever arm connected between said hose wand and said agitator assembly for amplifying [the] *a* force exerted by the hose wand on the agitator [assemble] *assembly*;

[h)] an adjustment means associated with said lever arm and said agitator assembly for generating a net traction force on said front and rear rotary agitators when in contact with a surface and said net traction force responsive to *the* force exerted on said hose wand by a user;

[i)] wherein, said suction conduit forms a continuous air channel between at least one of the rotary agitators and said output port;

[j)] wherein, said output port is designed to accept the hose wand, whereby dirt and dust agitated by the rotary agitators can be removed from the power head;

[k)] wherein, said front and rear rotary agitators rotate in opposite directions when powered by said power transfer means, and

[l)] wherein, said net traction force is in the direction of the front portion of the housing when the user is pushing the hose wand forward and said net traction force is in the direction of the rear portion of the housing when the user is pulling backward on the hose wand, whereby the vacuum power head provides a self-propelled function.

2. The vacuum power head in claim 1, further including[;]*:* a suction fan for producing a suction airflow;

a handle; *and* a dirt collection bag[; and], wherein the hose wand defines an air channel between said dirt collection bag and said output port for conducting the suction airflow to said dirt collection bag from said output port; wherein, said suction fan is connected to said electric motor for providing said suction airflow along said continuous air channel, whereby dirt sucked up by the airflow can travel to said dirt collection bag.

3. The vacuum power head in claim 1, wherein[;]*:* said adjustment means moves both front and rear rotary agitators with respect to the housing and around an axis between the agitators to provide said self-propelled function.

4. The vacuum power head in claim 1, wherein[;]*:* said adjustment means comprises an adjustment assembly for pivoting one of the rotary agitator into greater and lesser contact with the surface to provide the [differential] *net* traction force for propelling the vacuum power head forward and backward.

5. The vacuum power head in claim 1, wherein[;]*:* said agitator assembly is defined by said front and rear rotary agitator mounted substantially next to each other and pivotal about an axis between [them] *said front and rear rotary agitators*.

6. The vacuum power head in claim 5, wherein[;]*:* said front and rear rotary agitators are both mounted substantially in the front portion of the vacuum power head.

7. The vacuum power head in claim 1, wherein[;]*:* said agitator assembly is defined by said electric motor and said front and rear rotary agitator mounted substantially together so [they] *said front and rear rotary agitators* are moved as a unit by said lever arm.

8. The vacuum power head in claim 1, wherein[;]*:* said lever arm is defined by a pivot arm connected to only one rotary [agitator] *agitators* and responsive to [said] user movement to raise and lower that rotary agitator to provide the [differential] *net* traction force for said self-propelled function.

9. The vacuum power head in claim 8, wherein[;]*:* said agitator assembly is defined by said front and rear rotary [agitator] *agitators* mounted substantially next to each other and pivotal about an axis between [them] *said front and rear rotary agitators*.

10. The vacuum power head in claim 1, wherein[;]*:* said lever arm is connected to a support roller for raising and lowering either the front or rear [portion] *portions* of the housing to provide the [differential] *net* traction force on the front and rear agitators which are mounted to the housing for providing said self-propelled function.

11. A vacuum cleaner power head for cleaning a surface, comprising:

[a)] a housing having [a] front and rear [portion] *portions*;

[b)] a front rotary agitator and a rear rotary agitator;

[c)] an electric motor;

[d)] a power transfer means for transferring rotary power from the electric motor to the front and rear rotary agitators;

[e)] a suction conduit having an entrance and an output port;

[f)] a hose wand;

[g)] a lever arm responsive to the hose wand; *and*

[h)] an adjustment means associated with the lever arm and rotary agitators for adjusting [the] *a* contact force of at least one of the rotary agitators with respect to the surface;

[i)] wherein, the suction conduit forms a continuous air channel between at least one of the rotary agitators and the output port;

[j)] wherein, the hose wand is pivotally connected with respect to the housing and in communication with the continuous air channel, whereby dirt and dust agitated by the rotary agitators can be removed from the power head through the hose wand;

[k)] wherein, the front and rear rotary agitators rotate in opposite directions when powered by the power transfer means, and

[l)] wherein, the adjustment means provides a net traction force in the direction of the front portion of the housing when [the] *a* user is pushing the hose wand forward and wherein the net traction force is in the direction of the rear portion of the housing when the user is pulling backward on the hose wand, whereby the vacuum cleaner power head provides a self-propelled function.

12. The vacuum cleaner power head in claim 11, further including[;]*:* a suction fan connected to the electric motor for producing a suction airflow; and a dirt collection bag connected to the hose wand;

wherein, the suction conduit defines a continuous air channel from at least one of the rotary agitators, through the suction fan, and into the hose wand, and wherein the hose wand communicates the suction airflow between the output port and the dirt collection bag, whereby dirt sucked up by the suction airflow is carried to the dirt collection bag.

13. The vacuum cleaner power head in claim 11, wherein, said adjustment means moves both front and rear rotary agitators with respect to the housing and around an axis between the agitators to provide said self-propelled function.

14. The vacuum cleaner power head in claim 11, wherein, said front and rear rotary agitators are both mounted substantially in the front portion of the vacuum cleaner power head.

15. The vacuum cleaner power head in claim 11, wherein, the rotary agitators and the housing are fixed in relationship to each other, wherein the adjustment means pivots the housing and the rotary agitator with respect to the surface to adjust the net traction force for propelling the vacuum cleaner power head forward and backward.

16. [The] *A* vacuum cleaner power head for cleaning a surface, comprising:

[a)] a housing having [a] front and rear [portion] *portions*;

[b)] a hose wand pivotally mounted to the vacuum cleaner power head;

[c)] an electric motor;

[d)] a suction fan mechanically driven by the electric motor;

[e)] a front rotary agitator and a rear rotary agitator, both rotatably mounted to a fixed position on the housing;

[f)] a power transfer means for transferring rotary power from the electric motor to the front and rear rotary agitators, wherein the two rotary agitators rotate in opposite directions;

[g)] a suction conduit designed to accept a hose wand, wherein the suction conduit defines a continuous air channel from at least one of the rotary agitators, through the suction fan, and out of the vacuum cleaner power head through the hose wand, whereby dirt and dust agitated by the rotary agitators can be removed from the vacuum cleaner power head through the hose wand and into a dirt collection means connected to the hose wand, and

[h)] an adjustment means defined on the vacuum cleaner power head and responsive to force applied to the hose wand by a user for adjusting [the] *a* relative position of the front and rear rotary agitators with respect to the surface;

[i)] wherein, the front and rear rotary agitators rotate in opposite directions when powered through the power transfer means, and

[j)] wherein the adjustment means provides a net traction force in [the] *a* direction of the front portion of the housing when the user is pushing the hose wand forward and the net traction force is in the direction of the rear portion of the housing when the user is pulling backward on the hose wand, whereby the vacuum cleaner power head provides a self-propelled function.

17. The vacuum cleaner power head in claim 16, wherein, the electric motor, suction fan, and front and rear rotary agitators are all mounted at a substantially fixed location within the vacuum cleaner power head, whereby [the] adjustment of the relative positions of the front and rear portions of the housing[,] also adjusts [the] relative positions of the front and rear rotary agitators with respect to the surface.

18. The vacuum cleaner power head in claim 17, wherein, the adjustment means comprises by a support wheel comprising a pivot bearing mounted to the vacuum cleaner power head, wherein the vacuum cleaner power head pivots around the pivot bearing relative to the surface for adjusting the relative position of the front and rear rotary agitators with respect to the surface.

*19. A power head for a surface cleaning apparatus, the power head comprising:*

*a housing having front and rear portions;*

*a handle pivotally coupled with the housing;*

*an agitator assembly with a front rotary agitator and a rear rotary agitator;*

*an electric motor coupled to the front and rear rotary agitators for rotating the front and rear rotary agitators in opposing directions; and*

*an adjustment member joined with the housing, the adjustment member including a wheel that rotates independent of rotation by the front and rear rotary agitators, the adjustment member pivoting the housing to generate a net traction force from the front and rear rotary agitators on a surface that propels the housing along the surface, wherein the net traction force is in a front direction toward the front portion of the housing when the user is pushing the handle forward and the net traction force is in a rear direction toward the rear portion of the housing when the user is pulling backward on the handle.*

*20. The power head of claim 19, wherein the housing pivots in response to the pushing or pulling of the handle to raise one of the front and rear rotary agitators and lower another one of the front and rear rotary agitators relative to the surface to change the net traction force.*

*21. The power head of claim 19, wherein relative positions of the housing and the front and rear rotary agitators remain substantially constant as the housing pivots to change a direction of the net traction force.*

*22. The power head of claim 19, wherein the housing is an exterior housing and the wheel of the adjustment member is rotatably mounted to an inner housing that is disposed within and joined to the exterior housing, the wheel translating the pushing or pulling on the handle into pivoting of the exterior housing about the wheel in order to change a direction of the net traction force.*

*23. The power head of claim 19, wherein the wheel of the adjustment member is separate from the front and rear rotary agitators.*

*24. The power head of claim 19, wherein the adjustment member is disposed inside the housing between the front and rear rotary agitators.*

*25. The power head of claim 19, wherein the housing is supported on the surface by the wheel of the adjustment member and one or more of the front rotary agitator or the rear rotary agitator located within the housing.*

*26. A power head for a surface cleaning apparatus, the power head comprising:*

*a housing having front and rear portions;*

*front and rear agitator brushes rotatably mounted in the housing;*

*a motor coupled to the agitator brushes for rotating the agitator brushes in opposing directions;*

*a handle pivotally mounted to the housing; and*

*a wheel disposed in the housing that rotates independent of rotation by the agitator brushes, the wheel translating pushing or pulling on the handle into pivoting of the housing relative to a surface to raise one of the front and rear agitator brushes away from the surface and lower another one of the front and rear agitator*

*brushes toward the surface to generate a net traction force exerted by the agitator brushes on the surface that propels the housing along the surface, wherein the net traction force is in a front direction toward the front portion of the housing when the user is pushing the handle forward and the net traction force is in a rear direction toward the rear portion of the housing when the user is pulling backward on the handle.*

*27. The power head of claim 26, wherein the wheel is disposed in the housing between the front and rear agitator brushes.*

*28. The power head of claim 24, wherein the housing is an exterior housing, further comprising an inner housing rotatably mounted with the wheel in the exterior housing, the exterior housing and the inner housing pivoting about the wheel in response to the pushing or pulling of the handle.*

*29. The power head of claim 26, wherein the wheel is separate from the front and rear agitator brushes.*

*30. A power head for a surface cleaning apparatus, the power head comprising:*

*a housing having front and rear portions;*

*a front rotary agitator and a rear rotary agitator rotatably mounted in the housing;*

*a handle pivotally coupled to the housing;*

*a motor interconnected with the front and rear rotary agitators for rotating the front and rear rotary agitators in opposing directions; and*

*an adjustment assembly coupled with the housing and defining a pivot axis of the housing between the front and rear rotary agitators, the adjustment assembly pivoting the housing about the pivot axis independent of rotation by the front and rear rotary agitators based on pushing or pulling of the handle, the front and rear rotary agitators moved relative to a surface from pivoting of the housing to generate a net traction force on the surface that propels the exterior housing along the surface, wherein the net traction force is in a forward direction when the handle is pushed toward the front portion of the housing and the net traction force is in a rearward direction when the handle is pulled toward the rear portion of the housing.*

*31. The power head of claim 30, wherein the adjustment assembly includes a wheel coupled with the housing that rotates independent of rotation by the front and rear rotary agitators, the housing pivoting about the wheel in response to the pushing or pulling of the handle to raise or lower one of the front or rear rotary agitators and lower another one of the front and rear rotary agitators.*

*32. The power head of claim 30, wherein the adjustment assembly comprises a wheel disposed in the housing that rotates independent of rotation by the front and rear rotary agitators, the housing pivoting about the wheel in response to the pushing or pulling of the handle.*

*33. The power head of claim 30, further comprising a lever arm interconnecting the handle with the adjustment assembly, the lever arm translating the pushing or pulling of the handle into raising or lowering at least one of the front or rear rotary agitators with respect to the surface.*

*34. The power head of claim 30, wherein the housing pivots about the adjustment assembly in response to the pushing or pulling of the handle, the housing pivoting to raise or lower at least one of the front or rear rotary agitators with respect to the surface.*

*35. The power head of claim 30, wherein relative positions of the housing, the front rotary agitator and the rear rotary agitator remain approximately constant as the housing pivots about the adjustment assembly.*

*36. The power head of claim 30, wherein the housing is an exterior housing, further comprising an inner housing disposed in the exterior housing and rotatably joined with the adjustment assembly, the inner housing pivoting about the pivot axis to pivot the exterior housing.*

*37. The power head of claim 30, wherein the adjustment assembly is separate from the front and rear rotary agitators.*

* * * * *